US007949836B2

(12) United States Patent
Hillier, III et al.

(10) Patent No.: US 7,949,836 B2
(45) Date of Patent: May 24, 2011

(54) MEMORY CONTROLLER AND METHOD FOR COPYING MIRRORED MEMORY THAT ALLOWS PROCESSOR ACCESSES TO MEMORY DURING A MIRROR COPY OPERATION

(75) Inventors: Philip Rogers Hillier, III, Rochester, MN (US); Joseph Allen Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1808 days.

(21) Appl. No.: 10/865,250

(22) Filed: Jun. 10, 2004

(65) Prior Publication Data

US 2005/0278494 A1    Dec. 15, 2005

(51) Int. Cl.
*G06F 13/00* (2006.01)
(52) U.S. Cl. .................... 711/150; 711/149; 365/230.05
(58) Field of Classification Search .................... None
See application file for complete search history.

(56) References Cited

U.S. PATENT DOCUMENTS

| 6,496,909 | B1 * | 12/2002 | Schimmel ...................... 711/163 |
| 6,934,816 | B2 * | 8/2005 | Matthews et al. ............. 711/149 |
| 2005/0135176 | A1 * | 6/2005 | Ramakrishnan et al. 365/230.01 |

OTHER PUBLICATIONS

Hauser et al., "Is the Bang Worth the Buck? A RAID Performance Study", Sep. 1996, Fifth NASA Goddard Conference on Mass Storage Systems and Technologies, vol. 1, pp. 131-140, http://archive.nlm.nih.gov/pubs/bangbuck/bangbuck.php.*
"IBM Enterprise X-Architecture Technology", First Edition 2002, "Reaching the summit".
Hillier III et al., IBM Patent U.S. Appl. No. 10/860,404, filed Jun. 3, 2004, "Memory Controller and Method for Scrubbing Memory Without Using Explicit Atomic Operations".

* cited by examiner

*Primary Examiner* — Kaushikkumar Patel
(74) *Attorney, Agent, or Firm* — Martin & Associates, LLC; Derek P. Martin

(57) ABSTRACT

A memory controller performs a mirror copy function in a way that allows processor accesses to memory to continue during the mirror copy operations that make up the mirror copy function. Data integrity of mirror copy operations is assured by protocols set up in the memory controller. The result is a memory controller that performs a mirror copy function in a way that allows normal processor accesses to memory to be interleaved with mirror copy operations, thereby minimizing the impact on system performance of executing the mirror copy function.

9 Claims, 5 Drawing Sheets

US 7,949,836 B2

MEMORY CONTROLLER AND METHOD FOR COPYING MIRRORED MEMORY THAT ALLOWS PROCESSOR ACCESSES TO MEMORY DURING A MIRROR COPY OPERATION

BACKGROUND OF THE INVENTION

1. Technical Field

This invention generally relates to computer system memory, and more specifically relates to the copying of mirrored memory.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). One key component in any computer system is memory.

One way to boost the reliability of computer systems is to provide mirrored memory. In a computer system with mirrored memory, two separate banks of memory are provided, with each one being a copy (or "mirror") of the other. One known way to provide mirrored memory uses a memory controller that has two ports, one port for each bank of memory. Writes to either port are propagated to both ports, which results in the memory contents in both banks being identical to each other. In a computer system that has mirrored memory, if a hard error (such as a failed integrated circuit) is detected in one of the memory banks, the other memory bank is used exclusively for reads until the failed memory can be replaced. Once replaced, the contents of the good bank of memory must now be copied to the newly-replaced memory. The process of copying all data from one bank of memory to the other bank of memory is referred to herein as a "mirror copy function." The mirror copy function is typically made up of several mirror copy operations to small chunks of memory. Once the mirror copy function is complete, the reading from one of the ports that is designated the "master port" is enabled, thereby resuming the mirrored operation of the memory.

The problem with the prior art mirror copy function is the overhead associated with each mirror copy operation. Each time a mirror copy operation is started, the mirrored ports stop accepting normal memory commands, and the read and write queues must be cleared by executing all pending read and write operations. The result of repeating these steps for each and every chunk of memory is decreased system performance during execution of a mirror copy function. Without a way to perform a mirror copy in a way that minimizes the disruption in system performance, the computer industry will continue to be plagued with decreased performance during the execution of a mirror copy function.

DISCLOSURE OF INVENTION

A memory controller of the preferred embodiments performs a mirror copy function in a way that allows processor accesses to memory to continue during the mirror copy operations that make up the mirror copy function. Data integrity of mirror copy operations is assured by protocols set up in the memory controller. The result is a memory controller that performs a mirror copy function in a way that allows normal processor accesses to memory to be interleaved with mirror copy operations, thereby minimizing the impact on system performance of executing the mirror copy function.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 3:
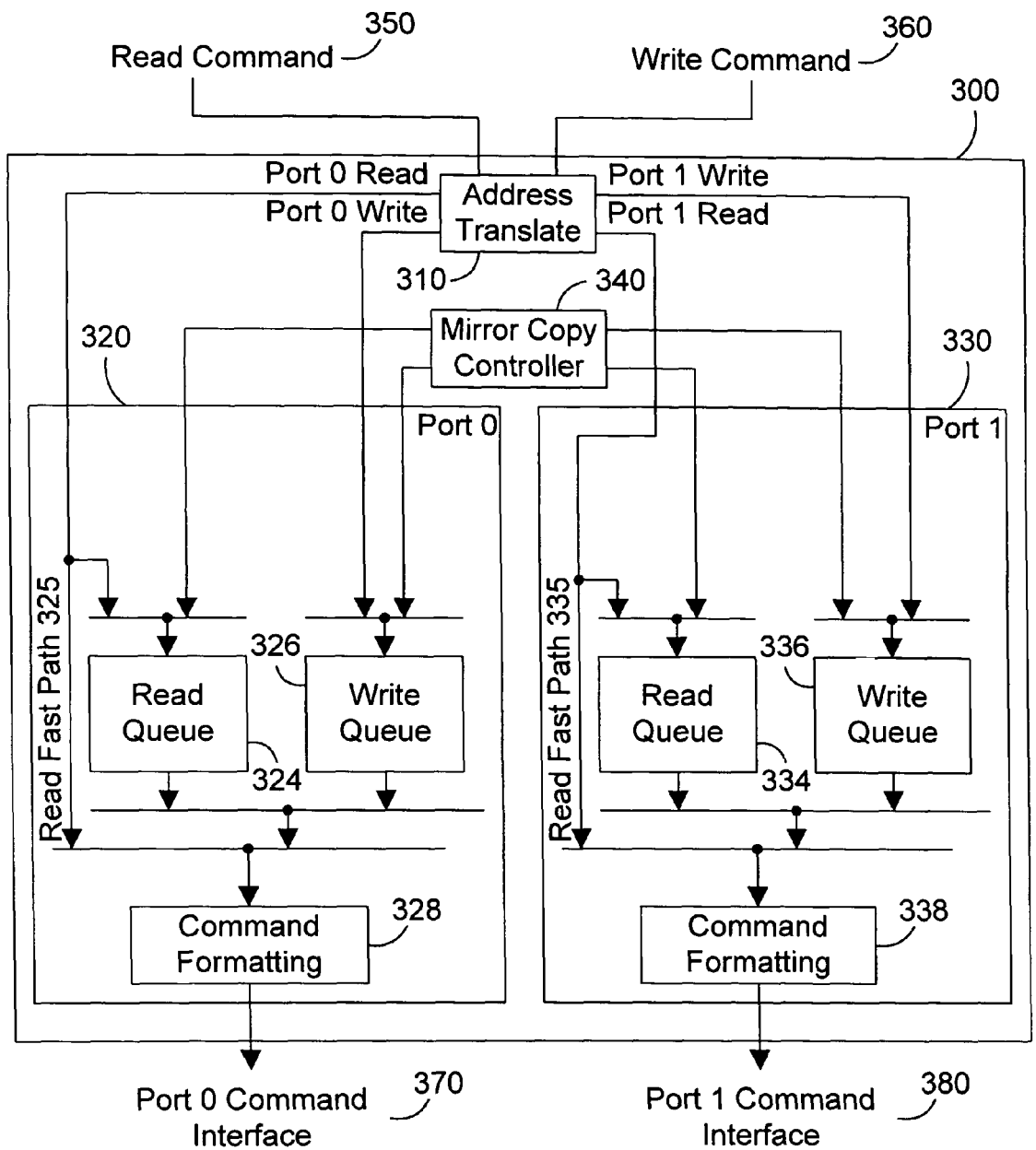
FIG. 3 is a block diagram of a prior art memory controller.

A prior art memory controller and method are first presented herein to provide a context for the discussion of the preferred embodiments. Referring to FIG. 3, a prior art memory controller 300 includes address translation logic 310, a first port 320, a second port 330, and a mirror copy controller 340. First port 320 includes a read queue 324, a write queue 326, and command formatting logic 328. A read command 350 from a processor may be written to the read queue 324, or may alternatively be passed via the fast read path 325 to the command formatting logic 328. The read queue 324 includes a plurality of entries that are processed by the memory controller 300. A write command 360 from the processor may be written to the write queue 326. The write queue 326 includes a plurality of entries that are processed by the memory controller 300. In this prior art memory controller 300, read operations have priority over write operations, so the read queue 324 is serviced until all its entries have been processed, at which time one or more entries in the write queue 326 may be processed. The command formatting logic 328 presents appropriate commands to the memory via the memory command interface 370, such as read and write commands to memory.

Second port 330 includes a read queue 334, a write queue 336, and command formatting logic 338. A read command 350 from a processor may be written to the read queue 334, or may alternatively be passed via the fast read path 335 to the command formatting logic 338. The read queue 334 includes a plurality of entries that are processed by the memory controller 300. A write command 360 from the processor may be written to the write queue 336. The write queue 336 includes a plurality of entries that are processed by the memory controller 300. As is the case for port 320, in port 330 read operations also have priority over write operations, so the read queue 334 is serviced until all its entries have been processed, at which time one or more entries in the write queue 336 may be processed. The command formatting logic 338 presents appropriate commands to the memory via the memory command interface 380, such as read and write commands to memory.

Figure 4:
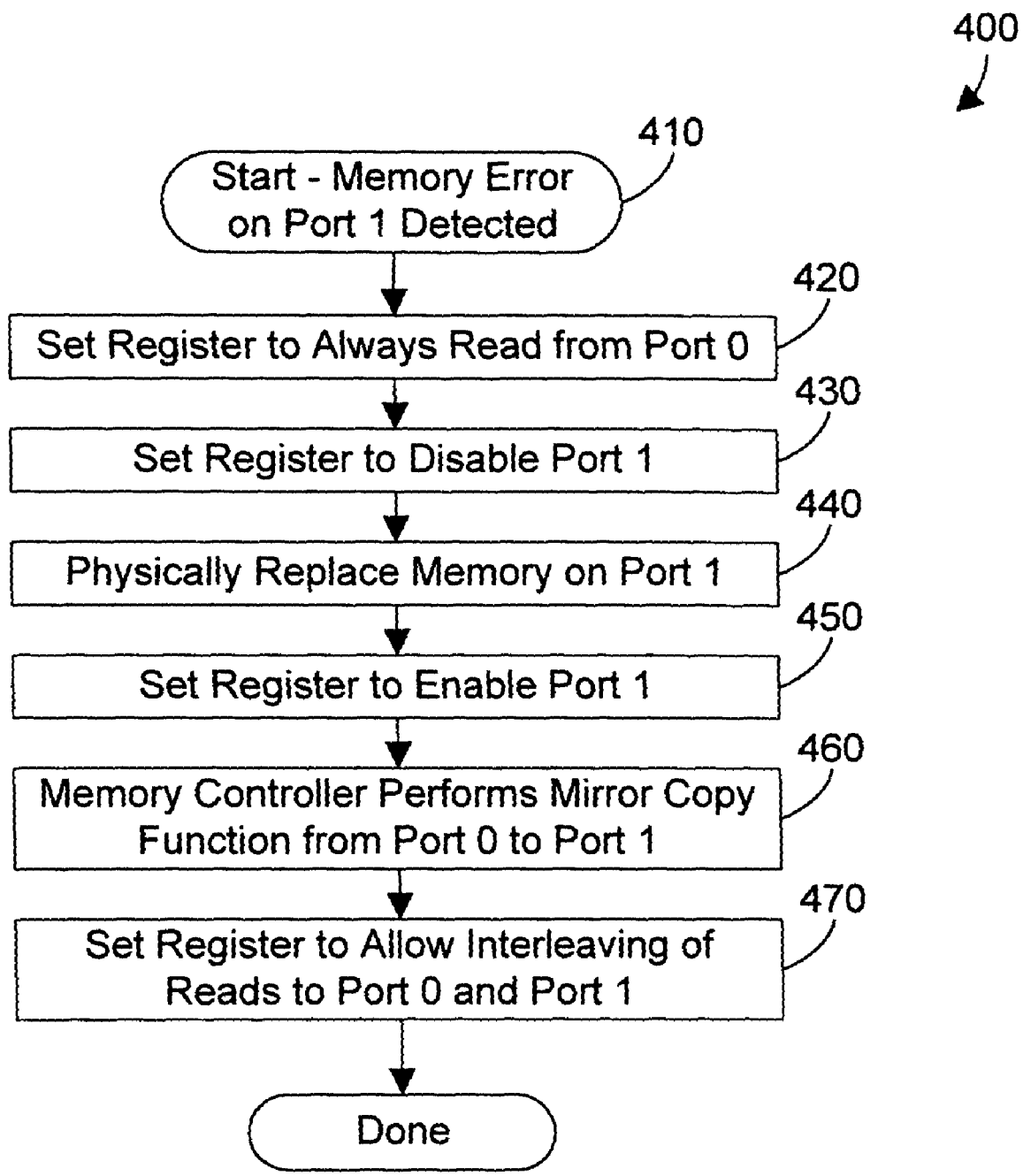
FIG. 4 is a flow diagram of a prior art method for performing a mirror copy as a result of detecting a hard error in memory.

The mirror copy controllers 340 control mirror copy operations that allow copying the memory in one port to the memory in the other port. This is useful when a hard memory error occurs, which leads to replacing the defective memory, which creates the need to copy all of the contents of the good memory into the newly-replaced memory. Referring to FIG. 4, a prior art method 400 shows steps performed in the prior art when a hard memory error is detected on port 1 (step 410). A register is set that causes all reads to occur from port 0 (step 420). A register is then set to disable port 1 (step 430). The defective memory on port 1 is then physically replaced (step 440). The register set in step 430 to disable port 1 is now set to enable port 1 (step 450). The memory controller then performs the mirror copy function from port 0 to port 1 (step 460). Once the mirror copy function in step 460 is complete, a register is set that allows interleaving of reads to port 0 and port 1 (step 470). The interleaving of reads to different ports is known in the art as one way to benefit from the presence of mirrored memory to improve system performance.

Figure 5:
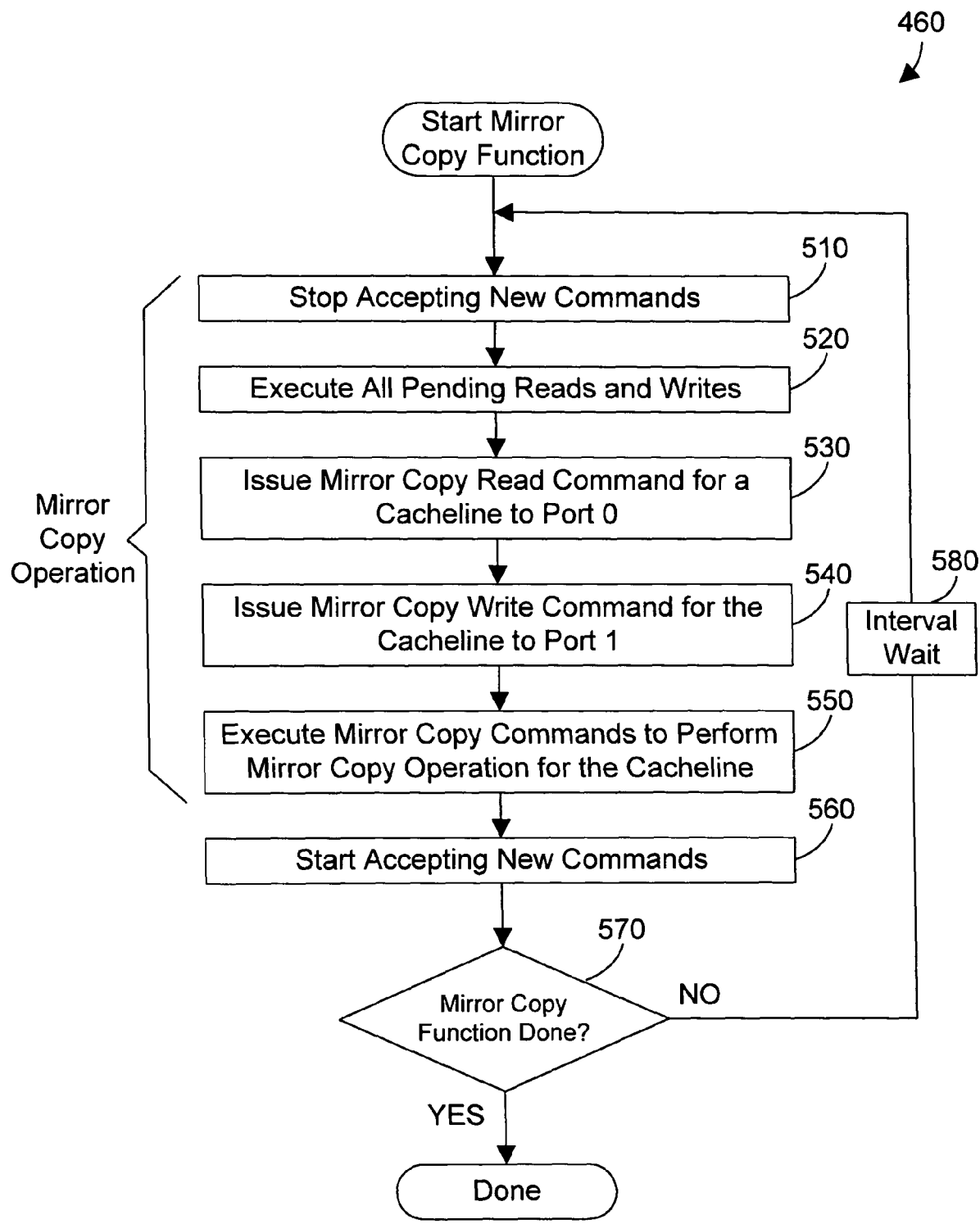
FIG. 5 is a flow diagram showing one suitable prior art implementation of step 460 in FIG. 4.

In the prior art method 400 shown in FIG. 4, performing the mirror copy function in step 460 presents a problem due to the overhead associated with performing the mirror copy operations that make up the mirror copy function. One known way to perform the mirror copy operation in step 460 of FIG. 4 is shown in detail as method 460 in FIG. 5. First, the memory controller stops accepting new commands (step 510). Next, all pending reads and writes in the read and write queues of both ports are executed (step 520). A mirror copy read command is then issued to port 0 (step 530). A mirror copy write command is then issued to port 1 (step 540). The memory controller then executes the mirror copy commands, thereby copying the contents of the cacheline from port 0 to port 1 (step 550). Note that steps 505, 510, 520, 530, 540 and 550 make up a single mirror copy operation, which is the copy of one cacheline from port 0 to port 1. Note that during the prior art mirror copy operation in step 550, all processor accesses are inhibited, because the memory controller 300 stopped accepting new commands in step 510. As a result, the processing of normal memory accesses grinds to a halt between steps 510 and 560, thereby negatively impacting system performance. Once the copy of the cacheline is complete, the memory controller begins accepting new commands for both ports (step 560). If the mirror copy function is not done (step 570=NO), which means there are more cachelines to copy, method 460 waits for some interval of time to pass (step 580) before looping back to step 505 and continuing. Once the mirror copy function is done (step 570=YES), which means that all the cachelines have been copied from port 0 to port 1, method 460 is done.

The time required to perform each mirror copy operation in the prior art results in substantial system overhead when executing mirror copy operations. In particular, the time required to stop accepting new commands in step 510, execute all pending reads and writes in step 520, and start accepting new commands in step 560 create overhead that negatively affects system performance during the execution of a mirror copy function. This is an unacceptable performance limitation in many situations, particularly in high-traffic server applications. To have a server bog down during execution of a mirror copy function can result in substantial lost revenue for a company that relies heavily upon servers for their business.

Recognizing the undesirable effect of impacting system performance so much during mirror copy operations, the present invention overcomes the limitations of the prior art by allowing normal processor accesses to be interleaved with accesses that perform the mirror copy operations. A mirror copy function is defined herein as a series of mirror copy operations on small portions of memory. One suitable memory portion is a cacheline. Thus, the preferred embodiments allow processor accesses for memory to be interleaved with mirror copy operations to cachelines. Data integrity is assured by implementing a protocol within the memory controller that assures that the mirror copy operation occurs correctly, with only a minimal impact on system performance. The net result is a substantial improvement in system performance during a mirror copy.

Figure 1:
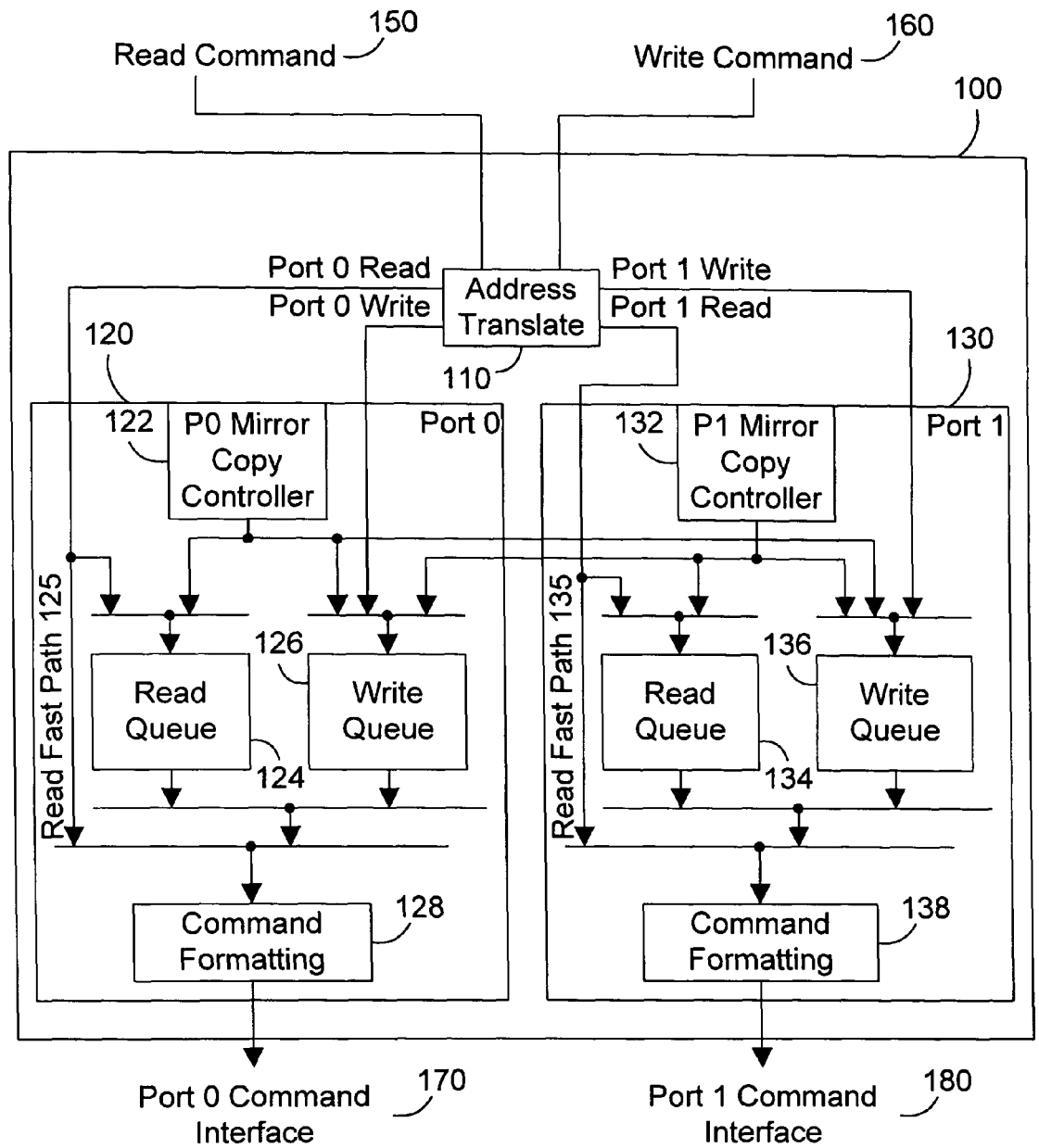
FIG. 1 is a block diagram of a memory controller in accordance with the preferred embodiments.

Referring now to FIG. 1, a memory controller 100 in accordance with the preferred embodiments includes address translation logic 110, a first port 120, and a second port 130. First port 120 includes a P0 Mirror Copy Controller 122, a read queue 124, a write queue 126, and command formatting logic 128. A read command 150 from a processor may be written to the read queue 124, or may alternatively be passed via the fast read path 125 to the command formatting logic 128. The read queue 124 includes a plurality of entries that are processed by the memory controller 100. A write command 160 from the processor may be written to the write queue 126. The write queue 126 includes a plurality of entries that are processed by the memory controller 100. In this memory controller 100 in accordance with the preferred embodiments, read operations have priority over write operations (as in the prior art), so the read queue 124 is serviced until all its entries have been processed, at which time one or more entries in the write queue 126 may be processed. The command formatting logic 128 presents appropriate commands to the memory via the memory command interface 170, such as read and write commands to memory.

Second port 130 includes a P1 Mirror Copy Controller 132, a read queue 134, a write queue 136, and command formatting logic 138. A read command 150 from a processor may be written to the read queue 134, or may alternatively be passed via the fast read path 135 to the command formatting logic 138. The read queue 134 includes a plurality of entries that are processed by the memory controller 100. A write command 160 from the processor may be written to the write queue 136. The write queue 136 includes a plurality of entries that are processed by the memory controller 100. In this memory controller 100 in accordance with the preferred embodiments, read operations have priority over write operations (as in the prior art), so the read queue 134 is serviced until all its entries have been processed, at which time one or more entries in the write queue 136 may be processed. The command formatting logic 138 presents appropriate commands to the memory via the memory command interface 180, such as read and write commands to memory.

Note that many of the features in FIG. 1 correspond to similar features in prior art memory controller 300 in FIG. 3. For example, port 120 with its read queue 124, read fast path 125, write queue 126, command formatting logic 128, and port 0 command interface 170, could be the same as the corresponding features 320, 324, 325, 326, 328, and 370, respectively, shown in FIG. 3. Similarly, port 130 with its read queue 134, read fast path 135, write queue 136, command formatting logic 138, and port 1 command interface 180, could be the same as the corresponding features 330, 334, 335, 336, 338, and 380, respectively, shown in FIG. 3. Note, however, that is equally within the scope of the preferred embodiments for each of the items in FIG. 1 to have different or additional functions when compared with the prior art items in FIG. 3.

A significant difference between the prior art memory controller 300 in FIG. 3 and the memory controller 100 in accordance with the preferred embodiments is the function of the two mirror copy controllers 122 and 132 when compared to the prior art mirror copy controller 340 in FIG. 3. In the prior art, mirror copy controller 340 performs a series of mirror copy operations that includes significant overhead. As a result, the prior art has the undesirable effect of negatively impacting system performance during execution of the mirror copy function. In the preferred embodiments, however, the mirror copy controllers 122 and 132 allow normal processor accesses to memory to be interleaved with the mirror copy operations. As a result, the mirror copy function is performed in a manner that minimizes the disruption of normal processing, thereby significantly enhancing system performance in executing a mirror copy function.

Figure 2:
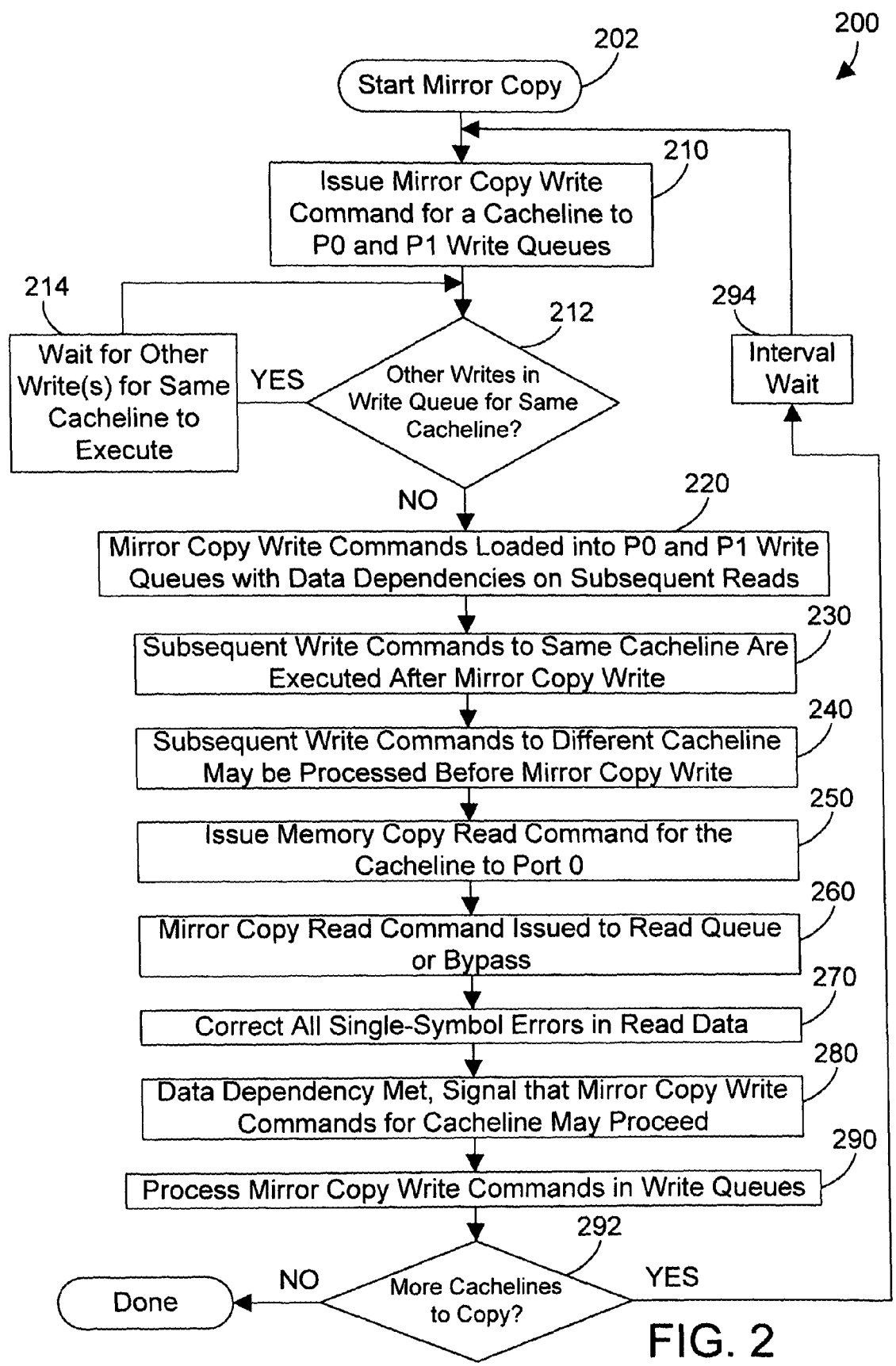
FIG. 2 is a flow diagram of a method for performing a mirror copy in accordance with the preferred embodiments.

Referring to FIG. 2, a method 200 begins when a mirror copy needs to be performed (step 202). A mirror copy write command is issued for a cacheline to both the port 0 and port 1 write queues (step 210). If there are any other writes to the same cacheline in the write queues (step 212=YES), method 200 waits for the other writes for the same cacheline to execute (step 214). Note that steps 212 and 214 apply to the write queues for both ports, which means step 214 will wait until all other writes to the same cacheline in both ports have been executed. Next, a mirror copy write command is loaded into the port 0 and port 1 write queues, with data dependencies on a mirror copy read command that has not yet been issued (step 220). This data dependency is a feature that is already available in known memory controllers. A latch with an output NeedDDone (need data done) is provided in prior art memory controllers to indicate when data for a pending read is not yet in the memory controller's central data buffer. Once the data is read into the central data buffer, the NeedDDone latch is cleared to indicate that the data dependency has been satisfied. The preferred embodiments recognize that the presence of the NeedDDone signal allows implementing a mirror copy in a way that allows interleaving normal processor accesses with the mirror copy operations.

Once the mirror copy write commands are written to the write queues in step 220, the memory controller 100 assures that subsequent writes to the same cacheline are not executed before the mirror copy write command (step 230). The memory controller 100 also assures that subsequent writes to different cachelines may be processed before the mirror copy write command is processed (step 240) because the mirror copy write does not affect the other pending writes to different cachelines. The mirror copy controller for port 0 then issues a mirror copy read command for the cacheline (step 250). The mirror copy read command is issued to the read queue 124 or to the read fast path (bypass) 125 (step 260). Once the data has been read by the mirror copy read command, the data is processed to correct all single-bit and single-symbol errors (step 270), and the processed data is written to the central data buffer. With the processed data now in the central data buffer, the data dependency for the mirror copy write commands in step 220 has now been met, so a signal is generated that the pending mirror copy write of the cacheline may proceed (step 280). In the preferred embodiments, this is accomplished by the NeedDDone latch being cleared once the data for the cacheline is written to the central data buffer. Because the data dependency has been met, the mirror copy write commands in the write queues may now be executed (step 290). If there are more cachelines to copy (step 292=YES), method 200 waits for a defined time interval to expire (step 294 before looping back to step 210, and continuing until there are no more cachelines to copy (step 292=NO).

Note that the correction of single-symbol soft errors is known in the art, and is often performed during special cycles in memory controllers known as scrub cycles. Sophisticated error correction circuitry has been developed that allow detecting any single-bit error, or any single-symbol error in a DRAM. A single-bit error occurs when one bit at a specified address changes state unexpectedly. A single-symbol error occurs when multiple bits within a packet (or symbol) at a specified address in a single DRAM chip change state unexpectedly. During a typical scrub cycle, a cache line is read, causing a corresponding read of the data from memory. The error correction circuitry detects if there are any single-bit or single-symbol errors, and if so, generates the correct data, which is then written to the cacheline, and in turn, back to the memory. In this manner, the scrub circuitry may successfully recover from any single-bit or single-symbol errors in memory. In many computer systems, the scrub circuitry tries to scrub all of system memory at least one each day. A brief description of memory scrubbing is found in IBM Enterprise X-Architecture Technology, First Edition 2002, pp. 19-21, which is incorporated herein by reference.

The memory controller in accordance with the preferred embodiments provides an enhanced mirror copy operation because it includes the error-correction capabilities of a scrub cycle. Thus, in step 270 the data read from one port is analyzed and corrected, if needed, before writing the data back to both ports in step 290. The memory controller of the preferred embodiments thus provides additional value by ensuring that no single-bit or single-symbol errors are propagated to the newly-replaced memory during the mirror copy.

Method 200 provides a significant advantage over the prior art by allowing processor accesses to memory to be interleaved with mirror copy operations to produce a minimal impact of the mirror copy operation on system performance. In the prior art method 460 in FIG. 5, processor accesses are disabled during each mirror copy operation between steps 510 and 550. By allowing processor accesses to occur during a mirror copy operation, the preferred embodiments allow normal operation of a computer system to continue, even during a mirror copy operation. The net result is the ability to perform a mirror copy function in a way that assures data integrity without unduly impacting system performance during execution of the mirror copy function.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, the memory controller and methods of the preferred embodiments may be applied to any semiconductor memory. In addition, while the examples above discuss performing a mirror copy one cacheline at a time, the preferred embodiments expressly extend to any suitable portion of memory (or granularity) for the mirror copy operation.

What is claimed is:

1. A memory controller comprising:
    a first memory port that includes a first read queue and a first write queue;
    a first mirror copy controller corresponding to the first memory port, the first mirror copy controller writing a mirror copy read command to the first read queue;
    a second memory port that includes a second read queue and a second write queue;
    a second mirror copy controller corresponding to the second memory port, the second mirror copy controller writing a mirror copy write command to the second write queue;
    logic for mirroring data to the first and second memory ports; and
    logic that performs a mirror copy operation in response to the mirror copy read command written to the first read queue and in response to the mirror copy write command written to the second write queue.

2. The memory controller of claim 1 wherein the mirror copy operation copies a portion of the memory from the first memory port to the second memory port.

3. The memory controller of claim 1 wherein the memory controller allows processor accesses to memory that occur during a mirror copy operation to be performed before termination of the mirror copy operation.

4. A memory controller comprising:
(A) a first memory port comprising:
  a first write queue for write operations to a memory coupled to the first memory port;
  a first read queue for read operations to a memory coupled to the first memory port;
  a first mirror copy controller that generates a mirror copy write command to the first write queue and that generates a mirror copy read command to the first read queue;
(B) a second memory port comprising:
  a second write queue for write operations to a memory coupled to the second memory port;
  a second read queue for read operations to a memory coupled to the second memory port;
  a second mirror copy controller that generates a mirror copy write command to the second write queue and that generates a mirror copy read command to the second read queue;
(C) the memory controller performing a mirror copy operation to a cacheline from the first memory port to the second memory port by performing the steps of:
  (C1) loading the mirror copy write command to the cacheline that includes a specified address into the second write queue specifying a data dependency on a subsequent mirror copy read command;
  (C2) loading the mirror copy read command to the cacheline into the first read queue;
  (C3) executing the mirror copy read command in the first read queue to read data from the first memory port, thereby satisfying the data dependency in (C1);
  (C4) executing the mirror copy write command in the second write queue to write the data to the second memory port.

5. The memory controller of claim 4 wherein the memory controller further performs the step of requiring any subsequent write to the same cacheline to be performed after the mirror copy write command is complete.

6. The memory controller of claim 4 wherein the memory controller further performs the step of allowing subsequent writes to a different cacheline to be processed before the mirror copy write command is complete.

7. A method for copying mirrored memory from a first memory port to a second memory port, the method comprising the steps of:
(A) issuing a mirror copy write command to the second memory port to a cacheline that includes a specified address;
(B) waiting for any writes to the same cacheline that are in a write queue for the second memory port to execute;
(C) loading a mirror copy write command into the write queue for the second memory port, specifying a data dependency on a subsequent mirror copy read command;
(D) issuing a mirror copy read command to the first port to read data from the specified address;
(E) indicating that the data dependency in step (C) is satisfied; and
(F) writing the data to the second memory port.

8. The method of claim 7 further comprising the step of requiring any subsequent write to the same cacheline to be performed after the mirror copy write command is complete.

9. The method of claim 7 further comprising the step of allowing subsequent writes to a different cacheline to be processed before the mirror copy write command is complete.

* * * * *